United States Patent [19]

Da Foe

[11] Patent Number: 4,591,029
[45] Date of Patent: May 27, 1986

[54] LOAD ACTUATING BRAKING APPARATUS

[76] Inventor: John P. Da Foe, 1817 North "C" St., Oxnard, Calif. 93030

[21] Appl. No.: 641,734

[22] Filed: Aug. 17, 1984

[51] Int. Cl.$^4$ .............................................. B60T 7/12
[52] U.S. Cl. .................................. 188/134; 192/8 R; 254/378
[58] Field of Search .................... 188/67, 78, 79, 82.1, 188/82.2, 82.3, 82.7, 82.77, 134, 139, 135; 254/375, 378; 192/8 R, 8 A, 15, 76, 78, 14

[56] References Cited

U.S. PATENT DOCUMENTS

| | | | |
|---|---|---|---|
| 2,727,604 | 12/1955 | Robertson | 192/8 R X |
| 3,258,248 | 6/1966 | Lerch et al. | 254/376 X |
| 3,335,831 | 8/1967 | Kalns | 192/8 R |
| 4,461,460 | 7/1984 | Telford | 254/378 X |

Primary Examiner—Bruce H. Stoner, Jr.
Assistant Examiner—Robert J. Oberleitner
Attorney, Agent, or Firm—Jack C. Munro

[57] ABSTRACT

An apparatus to facilitate lifting of heavy loads. The apparatus provides for a hand operated crank which rotates an input shaft which in turn rotates an output shaft which causes lifting of the load. The load would normally be mounted on a platform or other similar type of supporting structure. The apparatus includes a brake assembly which, upon stopping of supplying of the input torque, the brake assembly would automatically hold the load in its lifted position. Also, if the operator wishes to lower the load, reverse rotation of the input shaft will cause the load to be lowered.

3 Claims, 8 Drawing Figures

LOAD ACTUATING BRAKING APPARATUS

BACKGROUND OF THE INVENTION

The field of this invention relates to manually operated devices to assist in the lifting of heavy objects.

A lift is basically a device for achieving vertical transportation (against gravity) of a heavy device which cannot be easily manually lifted. Typical heavy devices are automobile engines, motors, pumps, generators, etc.

In the manufacturing and servicing of such heavy equipment, it is necessary to move such equipment a spaced distance above the floor of the building in which servicing or manufacturing would be occurring. Because of the inherent weight of such structures, it is necessary to employ some type of lifting device in which a high mechanical advantage is obtained, so that when operated, the heavy equipment is thereby raised.

A common type of device would be a platform which operates either through a gearing mechanism or a screw mechanism to achieve raising of the platform with respect to a fixed frame. Such lifting devices in the past have been quite common. The lifting action is obtained through the use of a crank which is manually rotated through an input shaft to cause rotation of the screw or gears to obtain the lifting of the platform upon which has been located the piece of heavy equipment.

Normally, such lifting devices include the use of a locking pawl to lock the crank arm in position when a described lifted height has been obtained. At times it has been an infrequent occurrence that the locking pawl does not engage properly or accidentally becomes disengaged and, as the crank arm is released, it quickly spins in the reverse direction. If during this reverse rotation of the crank arm, it happens to come into contact with the operators arm, substantial injury can occur with a broken arm being the most common occurrence.

SUMMARY OF THE INVENTION

The primary objective of the present invention is to construct a hand operated cranking mechanism to be utilized in conjunction with a lifting apparatus wherein upon ceasing of the cranking motion, the crank will remain in a stopped position regardless of the weight of the load on the lifting device.

Another objective is to obtain a completely safe crank apparatus which eliminates injuries to the operator.

Another objective of the present invention is to construct a hand operating lifting device wherein by reversing the lifting crank motion of the hand operated crank, the load can be lowered.

Another objective of the present invention is to construct a hand operated braking apparatus to be used in conjunction with a lifting device which can be easily operated by even the most unskilled individual.

The load actuating apparatus of this invention utilizes a fixed housing within which is mounted an input shaft and an output shaft. The fixed housing is to be fixedly secured onto a load supporting structure, such as a movable platform, upon which is to be mounted with a load. The movable platform is to be moved vertically as by a chain which is connected to the output shaft. The output shaft and the input shaft are connected together with only limited pivoting movement of the input shaft relative to the output shaft being possible. Mounted about both the input and output shaft is a brake pad assembly. The brake pad assembly is lockable against a movable housing with the movable housing being movably mounted within the fixed housing. A ratchet assembly operates between the fixed housing and the movable housing to normally prevent the movement of the movable housing in the direction which would tend to lower the load, yet permit movement of the movable housing in the direction which would normally raise the load. The load raising torque being applied to the input shaft positions the input shaft relative to the output shaft so as to locate the brake assembly in a locked position with the movable housing causing the movable housing to rotate in unison with the output shaft. When no load raising torque is applied to the input shaft, the relative position of the input shaft to the output shaft remains in the same position so that brake assembly is still locked to the movable housing preventing reverse rotation of both the output shaft and the input shaft which in turn prevents the lowering of the load. In this position the load will remain fixed in its raised position. Applying of the torque in the reverse direction to the input shaft causes a small amount of relative rotation to the input shaft relative to the output shaft which in turn partially releases the brake assembly relative to the movable housing and causes such to slip relative thereto. As a result the output shaft rotates in the opposite direction which causes the load to be lowered.

DETAILED DESCRIPTION OF THE SHOWN EMBODIMENT

Figure 1:
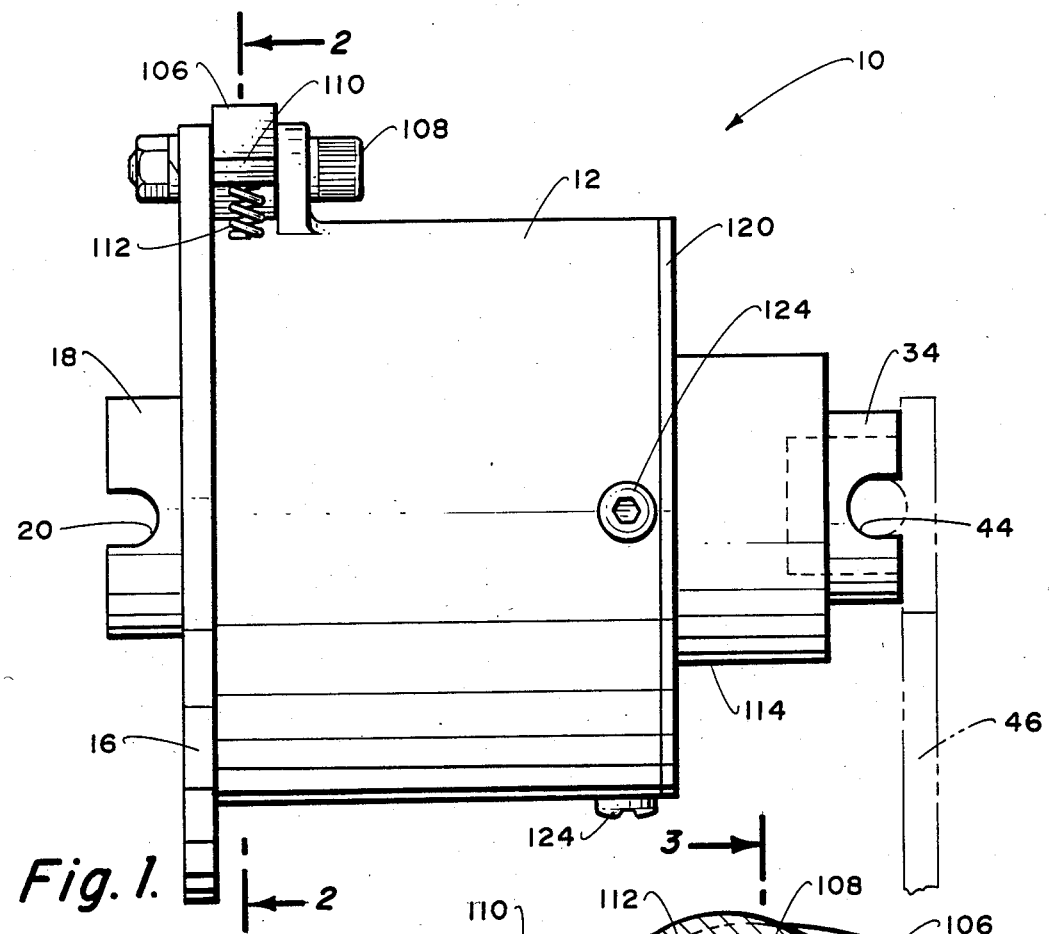
FIG. 1 is a side elevational view of the exterior surface of the load actuation braking apparatus of the present invention.
Figure 2:
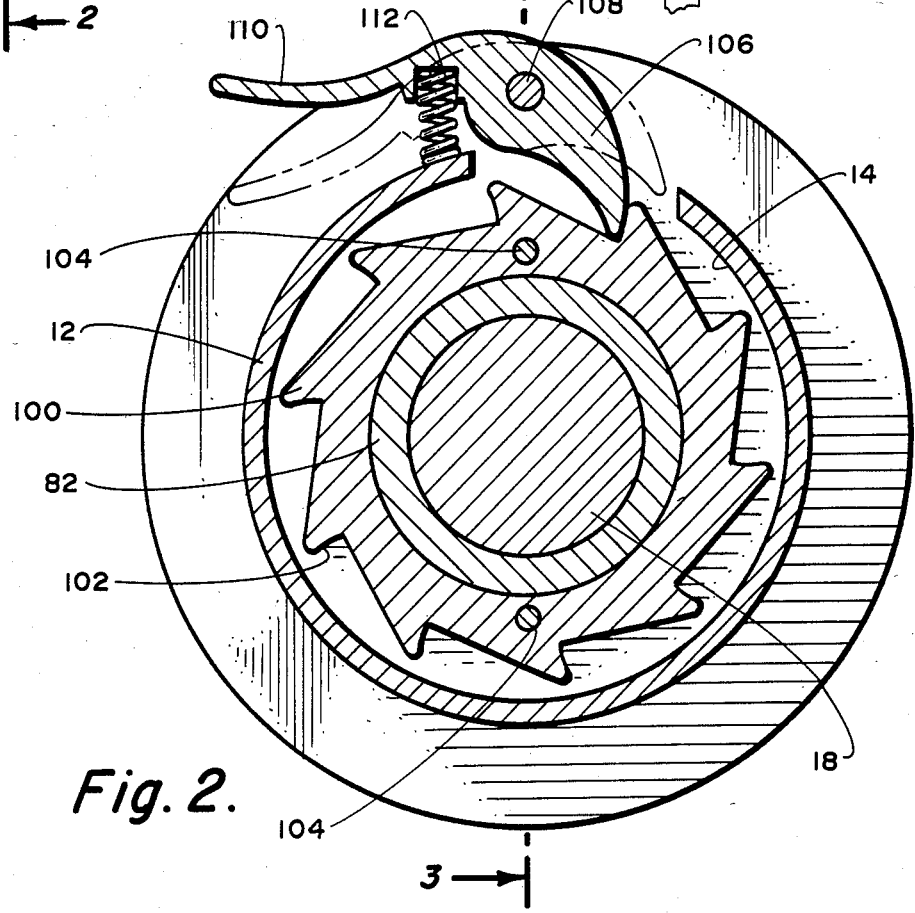
FIG. 2 is a cross-sectional view taken along line 2—2 of FIG. 1 showing in detail the ratchet assembly connected between the fixed housing and the movable housing of the load actuating braking apparatus of this invention.
Figure 3:
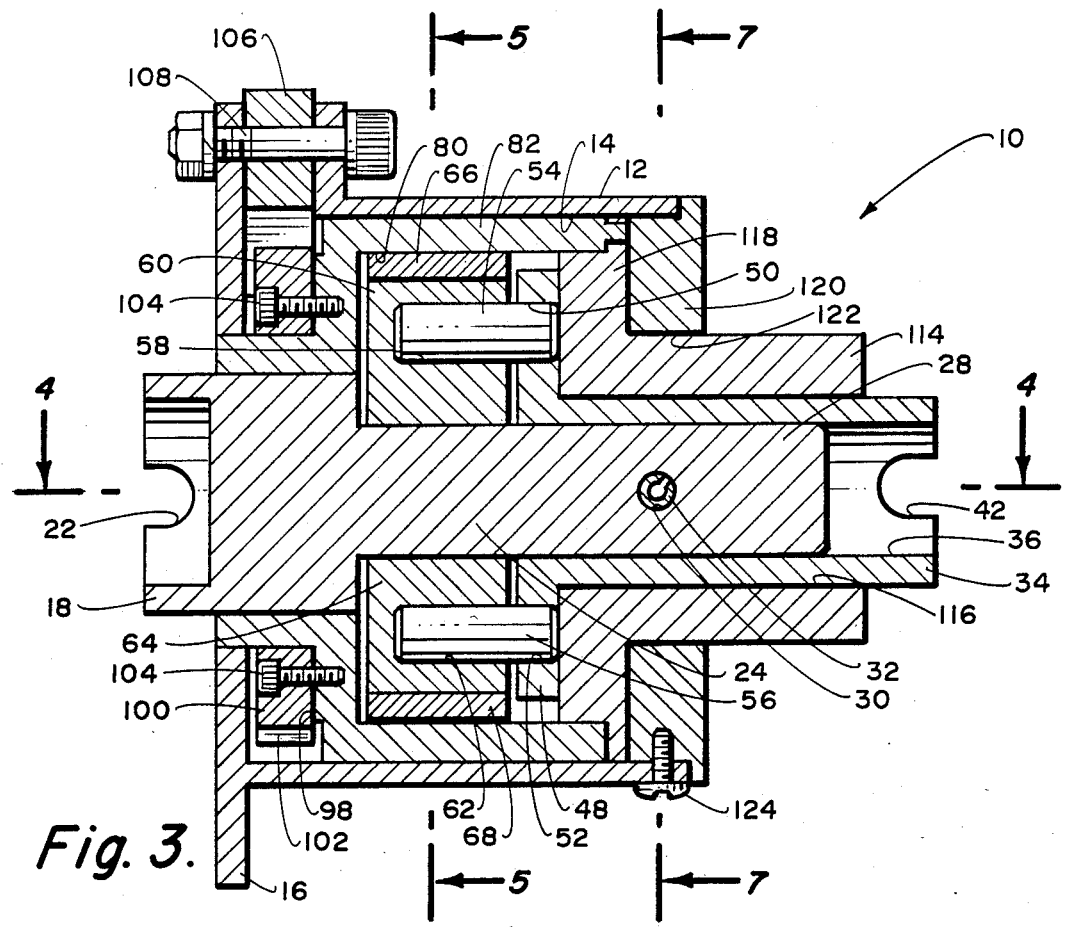
FIG. 3 is a cross-sectional view taken along line 3—3 of FIG. 2 showing more clearly the arrangement of different parts incorporated within the load actuating braking apparatus of this invention.
Figure 4:
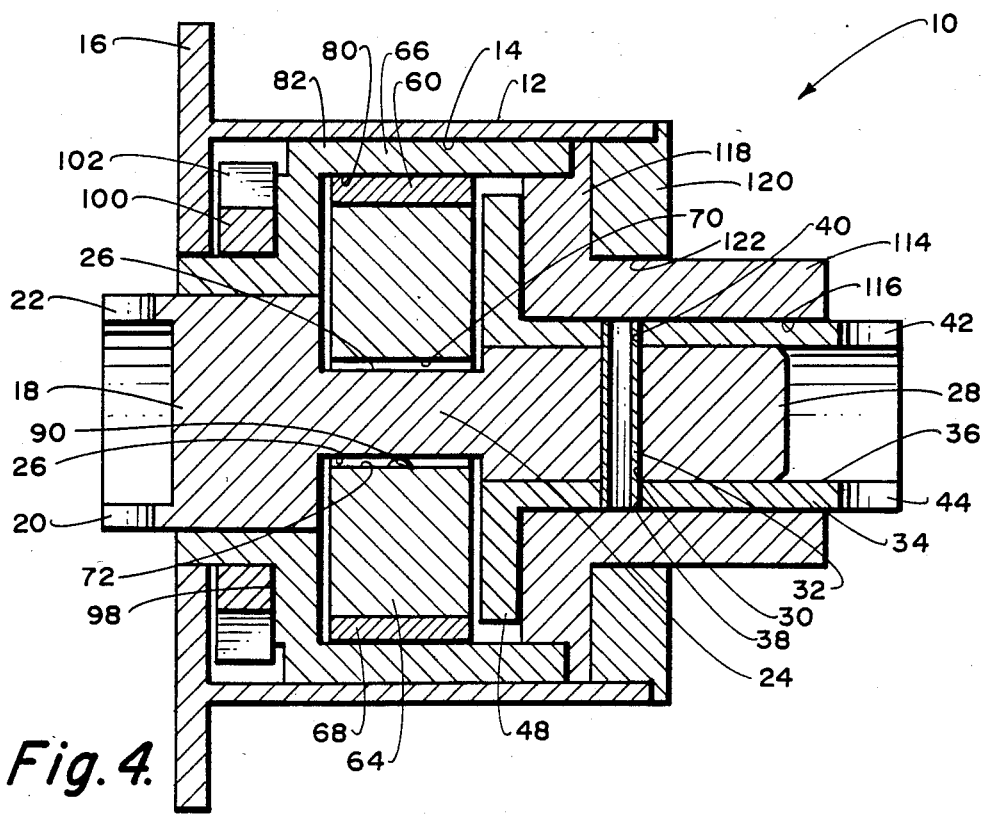
FIG. 4 is a cross-sectional view of the load actuating braking apparatus of this invention taken along line 4—4 of FIG. 3.

Referring particularly to the drawings, there is shown the load actuating braking apparatus 10 of this invention which comprises on its exterior surface thereof a cylindrically shaped fixed housing 12. Within the fixed housing 12 is located an interior chamber 14. The housing 12 has integrally formed thereto an attaching flange 16. The attaching flange 16 will normally include a series of openings (not shown) through which are to be connected conventional fasteners such as bolts to fixedly mount the housing 12 onto a structure (not shown). A typical structure would be a lifting stand in which the stand would include a lifting platform. A heavy object, such as an automobile engine, is to be mounted on the platform. The platform is to be raised by means of rotating a shaft which operates through a gearing system and a chain assembly. This gearing system and chain assembly, which are not shown, would be connected to output shaft 18. Output shaft 18 includes recesses 20 and 22 which are to operatively engage with the gearing system and chain assembly.

The output shaft 18 includes a midsection 24. The midsection 24 is non-cylindrical forming a pair of flattened parallel surfaces 26. Integrally connected to the midsection 24 and extending therefrom is an aft section 28. The aft section 28 is cylindrical in configuration.

Within the aft section 28 there is formed a hole 30 within which is snugly located a pin 32. Each end of the pin 32 extends approximately the same spaced distance from the exterior surface of the aft section 28.

Aft section 28 is to be closely mounted within chamber 36 of an input shaft 34. The pin 32 connects at each end thereof with elongated slots 38 and 40 diametrically formed through the wall of the input shaft 34. The output shaft 18 is to be pivotable in respect to the input shaft 34 with the limits of the pivoting movements being defined by length of the slots 38 and 40. It is to be noted that lineal movement of the output shaft 18 with respct to the input shaft 34 is prevented. The purpose of the pivoting of the output shaft 18 in respect to the input shaft 34 will be explained further on in this specification.

The free outer ends of the input shaft 34 terminates in a pair of recesses 42 and 44. The recesses 42 and 44 are basically similar to recesses 20 and 22. The recesses 42 and 44 are to connect with pins which are formed on a crank handle 46.

The inner end of the input shaft 34 is formed into a flange 48. Diametrically mounted within the flange 48 are a pair of holes 50 and 52. Fixedly mounted within the hole 50 is a pin 54. A similar pin 56 is fixedly mounted within the hole 52. The pin 54 extends within a hole 58 within a brake shoe housing 60. The housing 60 is pivotly mounted on the pin 54. The pin 56 is located within a hole 62 which is formed within a brake shoe housing 64. Again, the brake shoe housing 64 is pivotly mounted on the pin 56.

The outer surface of the brake shoe housing 60 has fixedly mounted thereon a brake pad 66. A similar brake pad 68 is fixedly mounted on the exterior surface of the brake shoe housing 64.

Brake shoe housing 60 includes an interior recess 70. A similar interior recess 72 is formed within the brake shoe housing 64. One of the flat surfaces 26 connects with recess 70 with the other of the flat surfaces 26 connecting with the recess 72.

Mounted within the brake shoe 60 and connecting with the recess 70 is a steel ball bearing 74. The ball bearing 74 is under constant spring bias by means of a coil spring 76. Spring 76 rests within recess 78 formed within the brake pad 60. Spring 76 pressing against the ball 74 in turn presses against the flattened area 26 tends to exert a continuous bias tending to maintain the surface of the shoe 66 in contact with the drum surface 80 of a movable housing 82. Also assisting and keeping the brake pad 66 in contact with the drum surface 80 is a coil spring 84 which abuts against brake drum 64. The coil spring 84 is mounted within recess 86 formed within the brake pad housing 60.

In a similar manner, the brake pad 68 is also pressed tightly against the surface 80 by means of coil spring 88 which acts against ball bearing 90 which in turn rests against the flattened surface 26. The coil spring 88 sets within recess 92 formed within the brake shoe housing 64. Also, there is utilized a coil spring 94 which is mounted within recess 96 which in turn presses against the brake shoe housing 60.

The movable housing 82 is located within, in a close conforming manner, the interior chamber 14. However, the movable housing 82 is to be pivotable within the chamber 14. Fixedly mounted onto a front annular surface 98 of the movable housing 82 is a ratchet gear 100. The ratchet gear 100 includes a series of ratchet teeth 102. The ratchet gear 100 is mounted by means of conventional bolt fasteners 104 to the surface 98 of the movable housing 82.

Connectable with the ratchet teeth 102 is a pawl 106. The pawl 106 is pivotly mounted by means of bolt fastener 108 to the fixed housing 12. The free outer end of the pawl 106 is formed into a handle 110. The pawl 106 is continuously biased by means of a spring 112 to engage with a tooth 102 of the ratchet wheel 100.

Located about the exterior surface of the input shaft 34 is a collar 114. The collar 114 has an open ended longitudinal opening 116 within which is located the shaft 34. The inner surface of the collar 114 is formed into an annular flange 118. Flange 118 is to abut against the flange 48.

Located about the collar 114 is a disc shaped cover 120. The collar 114 is to be locatable within opening 122 which is centrally disposed within the cover 120. The cover 120 is to be fixedly mounted by fasteners 124 to the fixed housing 12.

Figure 8:
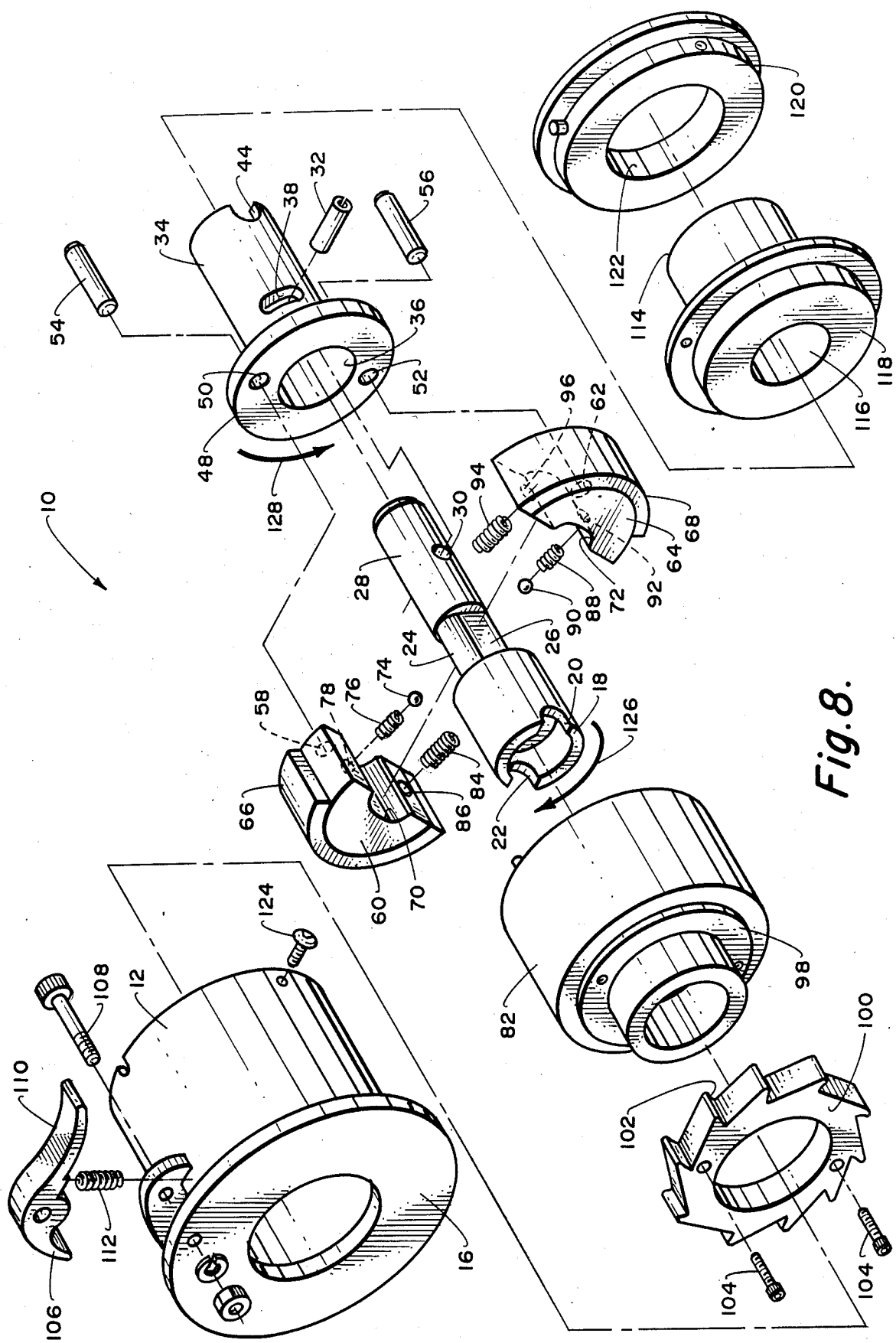
FIG. 8 is an exploded isometric view of the entire arrangement of parts of the load actuating braking apparatus of this invention.

The operation of the apparatus 10 of this invention is as follows: It will be assumed that the output shaft 18 is connected to a platform (not shown) upon which is located the load (not shown) such as an engine or other piece of heavy equipment. Also, the platform is located a spaced distance above the floor or ground. Therefore, there is a constant torque being applied to the output shaft 18 which will be defined as counterclockwise which is in the direction denoted by arrow 126 shown within FIG. 8.

Figure 6:
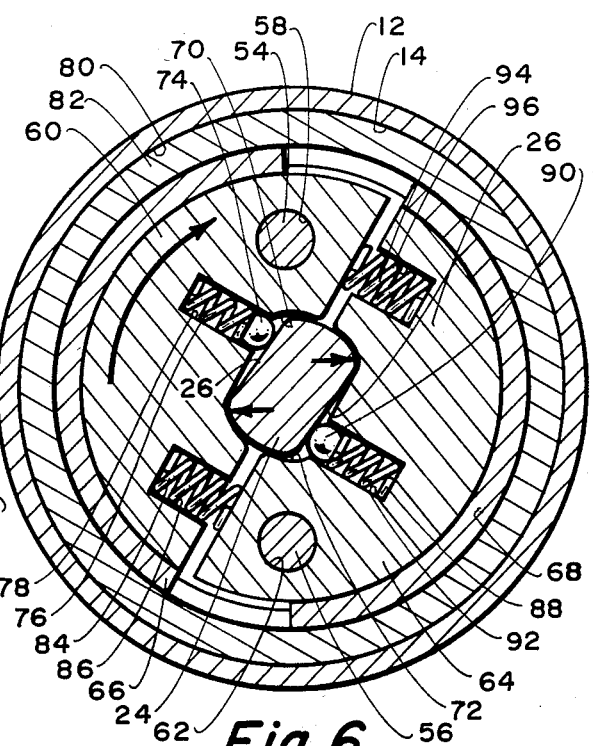
FIG. 6 is a view similar to FIG. 5 but showing the position of the input shaft relative to the output shaft in order to lock the brake assembly relative to the movable housing.
Figure 7:
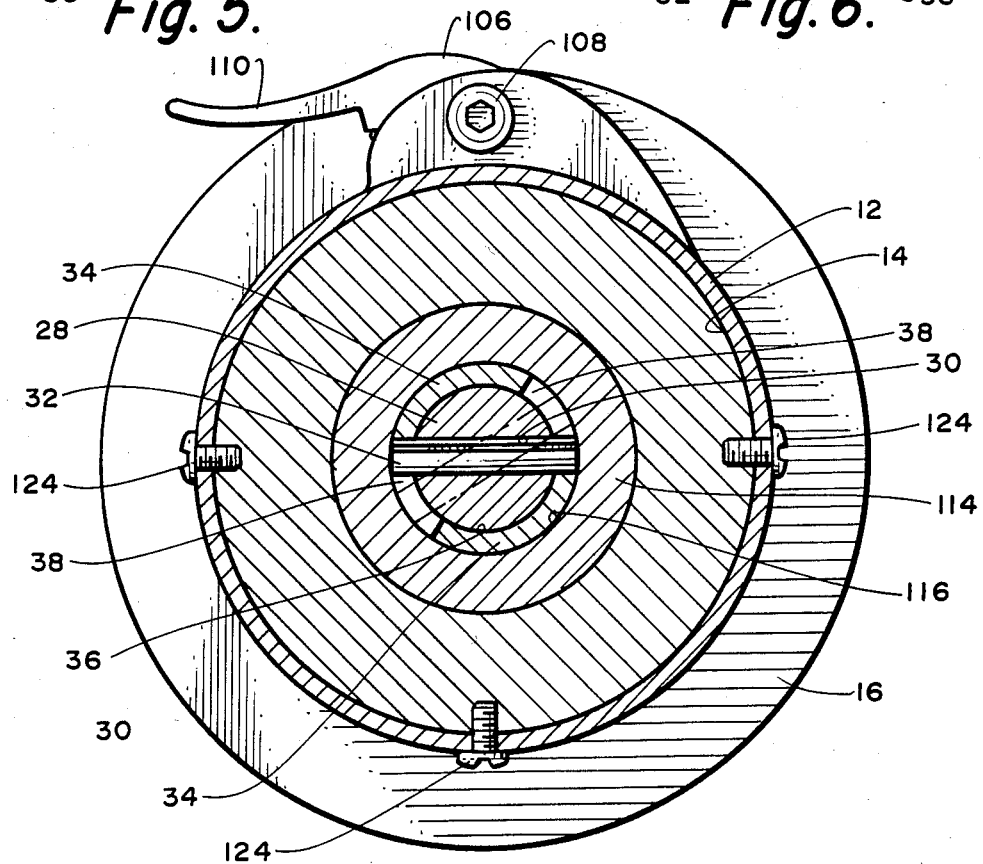
FIG. 7 is a cross-sectional view taken along line 7—7 of FIG. 3.

Let it be assumed that there is no input torque being supplied to the input shaft 34 with the input shaft 34 being stationary. In this position, pin 32 is located toward one end of the slots 38 and 40 such that the midsection 24 is canted with respect to the brake shoe housings 60 and 62 as is shown in FIG. 6 of the drawings. This canting is due to the spring action from the springs 76 and 88 which cause the output shaft 18 to be moved into this canted position so that the corners of the flattened areas 26 press against the brake shoe housings 60 and 64 tending to force the brake shoes 66 and 68 into tight engagement with the drum surface 80, thereby locking together the movable housing 82 and the shafts 18 and 34. The locking together is assisted also by the springs 84 and 94.

If an input torque, defined as clockwise, would be applied by the crank arm 46 to the input shaft 34 in the direction of arrow 128, the position shown within FIG. 6 will be maintained with rotation occuring of the shaft 34, the movable housing 82 and the output shaft 18. As this rotation occurs the pawl 106 will continually engage sequentially with teeth 102. Therefore, if the operator does not continue to apply input torque to the input shaft 34, the movable housing 82 will remain in its established position which means that the load itself will remain in its established height above the floor. If the operator wishes to lower the load, one way this can occur is by pressing on handle 110 which will cause the pawl 106 to disengage from the teeth 102 of the ratchet wheel 100. The operator can then move the crank arm 106 in the counterclockwise direction which will cause the output shaft 18 to be also rotated in the same direction.

Figure 5:
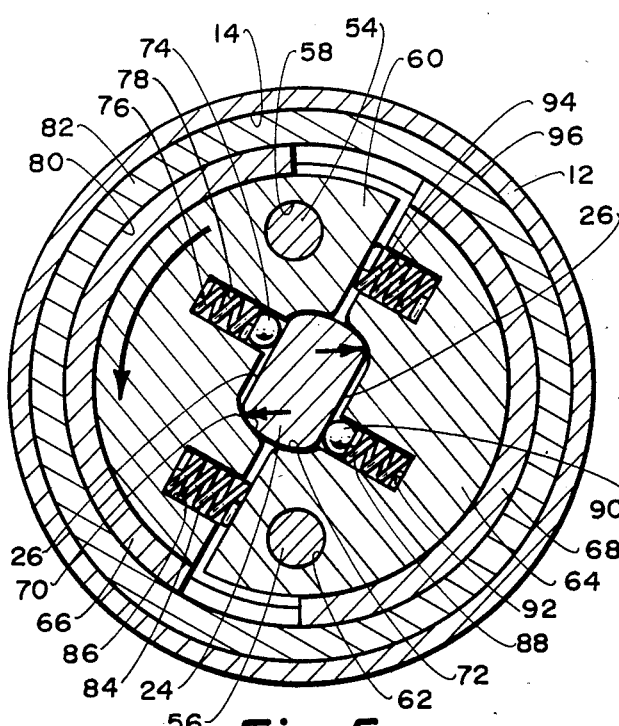
FIG. 5 is a cross-sectional view taken along line 5—5 of FIG. 3 showing the position of the input shaft relative to the output shaft and the brake assembly in order to permit lowering of the load connected to the output shaft.

If the operator wishes to lower the load without using the pawl 106, the operator only needs to exert a counterclockwise torque by the handle 46 to the input shaft 34. This torque will cause the midsection 24 to move to a slightly less canted position with respect to the brake shoe housings 60 and 64 as is shown in FIG. 5 of the drawings. This causes the brake shoes 66 and 68 to not be pressed as tightly against the drum surface 80. As a result, slippage occurs between the drum surface 80 and the brake shoes 66 and 68. The input shaft 34 as well as the output shaft 18 are rotated counterclockwise with the movable housing 82 remaining fixed. Therefore, the load is lowered and will continue to be lowered as long as the operator continues to rotate the crank arm 46 in the counterclockwise direction. Once the operator stops so rotating the crank arm 46, the midsection 24 will again move to the canted position as shown in FIG. 6 thereby locking together the shafts 34 and 18 to the movable housing 82.

What is claimed is:

1. A load actuating braking apparatus comprising:
an output shaft, said output shaft being under continuous torque tending to rotate said output shaft in a counterclockwise direction;
an input shaft, said output shaft being connected by connection means to said input shaft, clockwise rotation of said input shaft causes clockwise rotation of said output shaft;
a movable housing located about said output shaft and said input shaft;
a brake assembly located about said output shaft, said brake assembly having a brake pad assembly, said brake pad assembly being movable between a total braking position and a partial braking position, said brake pad assembly being located in tight contact with said movable housing when in said total braking position which is when said input shaft is rotated clockwise and when no input torque is being applied to said input shaft;
an actuation mechanism connected between said output and input shafts and said brake pad assembly, rotation of said input shaft counterclockwise causes said actuation mechanism to move said brake pad assembly to said partial braking position, whereby said brake pad assembly rotates counterclockwise relative to said movable housing and said output shaft also rotates counterclockwise; and
said connection means comprising a pin being fixedly mounted to said output shaft, said output shaft being mounted within said input shaft in a close conforming manner, an elongated slot being formed within said input shaft, said pin being locatable within said elongated slot, relative movement between said output shaft and said input shaft being limited by the length of said elongated slot.

2. A load actuating braking apparatus comprising:
an output shaft, said output shaft being under continuous torque tending to rotate said output shaft in a counterclockwise direction;
an input shaft, said output shaft being connected by connection means to said input shaft, clockwise rotation of said input shaft causes clockwise rotation of said output shaft;
a movable housing located about said output shaft and said input shaft;
a brake assembly located about said output shaft, said brake assembly having a brake pad assembly, said brake pad assembly being movable between a total braking position and a partial braking position, said brake pad assembly being located in tight contact with said movable housing when in said total braking position which is when said input shaft is rotated clockwise and when no input torque is being applied to said input shaft;
an actuation mechanism connected between said output and input shafts and said brake pad assembly, rotation of said input shaft counterclockwise causes said actuation mechanism to move said brake pad assembly to said partial braking position, whereby said brake pad assembly rotates counterclockwise relative to said movable housing and said output shaft also rotates counterclockwise; and
said brake pad assembly comprising a plurality of brake pads, each said brake pad being pivotly mounted by a pivot pin onto said input shaft, said output shaft including cam means, said cam means to connect with said brake pad assembly being located in said total braking position, said cam means physically contacting each of said brake pads tightly pressing same against said movable housing, location of said brake pad assembly in said partial braking position moves said cam means relative to said brake pad assembly permitting said brake pads not being tightly pressed against said movable housing.

3. The load actuating braking apparatus as defined in claim 2 wherein:
said brake pads being continuously spring-biased toward said total braking position.

* * * * *